Oct. 26, 1943. G. F. D'ALELIO 2,332,898
SYNTHETIC COMPOSITIONS COMPRISING HYDROLYZED, ACETALIZED,
AND/OR KETALIZED COPOLYMERS OF VINYL ESTERS
AND UNSATURATED ALKYD RESINS
Filed June 29, 1940
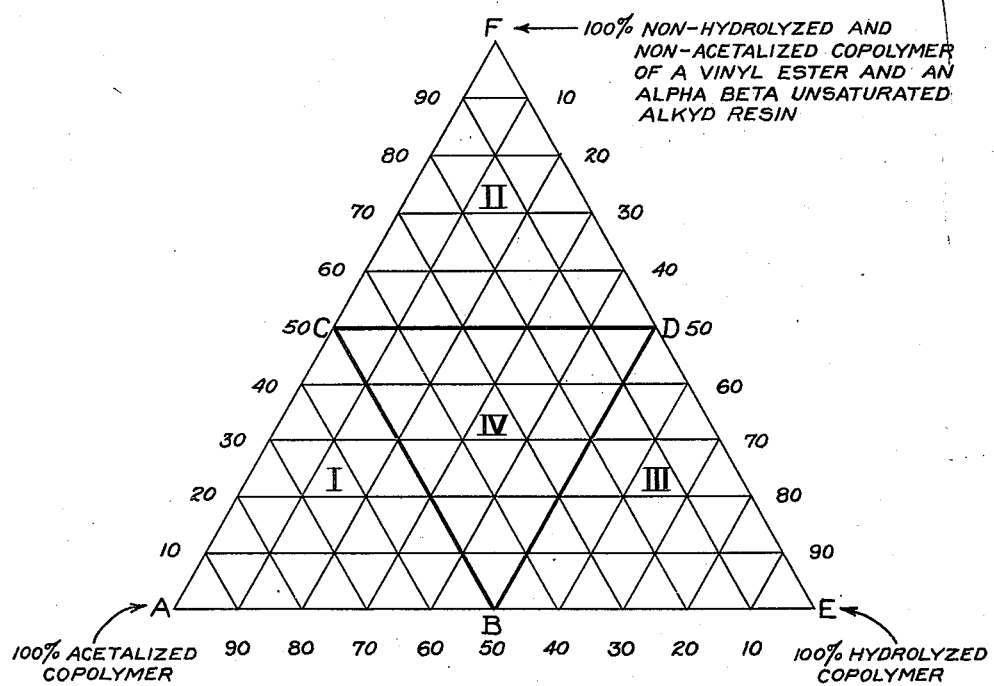
Inventor:
Gaetano F. D'Alelio,
by Harry E. Dunham
His Attorney.

Patented Oct. 26, 1943

2,332,898

UNITED STATES PATENT OFFICE 2,332,898

SYNTHETIC COMPOSITION COMPRISING HYDROLYZED, ACETALIZED, AND/OR KETALIZED COPOLYMERS OF VINYL ESTERS AND UNSATURATED ALKYD RESINS

Gaetano F. D'Alelio, Pittsfield, Mass., assignor to General Electric Company, a corporation of New York Application June 29, 1940, Serial No. 343,227

20 Claims. (Cl. 174—125)

This invention relates to the production of new materials having valuable and characteristic properties that make them especially suitable for use in industry, for example in molding, laminating, coating and adhesive applications, and for other purposes. The invention is concerned more particularly with the production of compositions of matter comprising an acetalized, aketalized or an acetalized and ketalized copolymer (or copolymers) of a plurality of copolymerizable materials, one of which is a vinyl ester having at least one

grouping and another of which is a modified or unmodified unsaturated alkyd resin. Specifically the unsaturated alkyd resins used in carrying the present invention into effect are those obtained by esterifying a polyhydric alcohol (or a mixture of a polyhydric alcohol and a monohydric alcohol) with a substance comprising an alpha, beta polycarboxylic acid containing aliphatic unsaturation between the alpha and beta carbon atoms. In producing these unsaturated alkyd resins the alcohol (or alcohols) are esterified without destroying the unsaturation present in the polycarboxylic acid and the esterification is carried far enough to cause more than one acid residue to be present in the resin molecule. Examples of unsaturated alkyd resins are ethylene glycol maleate, diethylene glycol fumarate, tetraethylene glycol maleate phthalate, etc. Such alkyd resins properly may be termed "alpha, beta unsaturated alkyd resins."

It has been suggested heretofore that synthetic compositions may be prepared by partially hydrolyzing (saponifying) a mixed polymerization product of two different vinyl esters (or a vinyl ester and an ester of acrylic acid), each of said esters having a single

grouping and no other polymerizable grouping, and reacting the partially hydrolyzed product with an aldehyde or a ketone to introduce acetal or ketal groups into the product. The mixed polymerization product used as a starting reactant is of the thermoplastic (heat-softening) type and its properties are, in large part, carried through to the final product.

I have discovered that synthetic compositions, which are different from, and in many respects superior to, organic artificial masses heretofore known, can be produced by acetalizing, ketalizing or acetalizing and ketalizing a hydrolyzed copolymer of a plurality of copolymerizable materials, one of which is a vinyl ester having at least one $$CH_2=C\diagup_\diagdown$$

grouping (e. g., vinyl formate, vinyl acetate, etc.) and another of which is an unsaturated alkyd resin.

When a vinyl ester having at least one $$CH_2=C\diagup_\diagdown$$

grouping (hereafter for brevity designated generally as "vinyl ester") is copolymerized with an alpha, beta unsaturated alkyd resin (hereafter for brevity designated generally as "unsaturated alkyd resin") cross-linkage takes place. Thus, a copolymer of vinyl acetate and ethylene glycol fumarate has the graphic structure

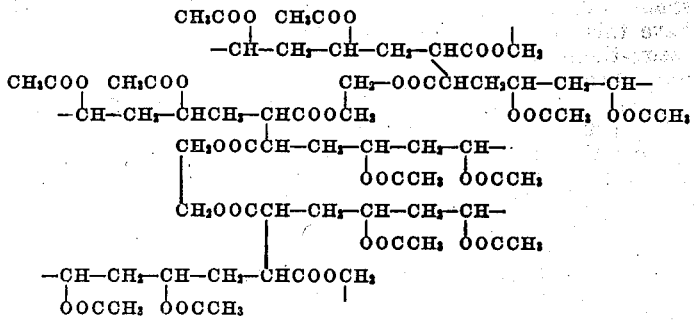

These cross-linked copolymers of vinyl esters and unsaturated alkyd resins are superior in many respects to polymerized vinyl esters alone. When cross-linked, they become infusible and substantially insoluble in all the ordinary solvents. For example, a copolymer of 1% ethylene glycol maleate and 99% vinyl acetate is infusible and is insoluble in alcohol, benzene, acetone, acetic acid, etc. In marked contrast, polyvinyl acetate is thermoplastic (fusible) and is soluble in alcohol, acetone, acetic acid diluted with water, etc. The impact and flexural strengths of the cross-linked copolymers of vinyl esters and unsaturated alkyd resins also are much higher than the linear polymers prepared from vinyl esters having a single

grouping and no other polymerizable grouping and the linear polymers obtained by polymerizing mixtures of different vinyl esters (or mixtures of vinyl esters and acrylic esters), each of which esters has a single

grouping and no other polymerizable grouping. A disadvantage in the practical utilization of these cross-linked copolymers of vinyl esters and unsaturated alkyd resins has been that they could not be molded to the desired shape after being copolymerized to an insoluble, infusible state.

The present invention is based on my discovery that a cross-linked copolymer of a vinyl ester having at least one

grouping and an unsaturated alkyd resin (more particularly a resinous reaction product of a substance comprising a polyhydric alcohol, or a mixture of a polyhydric alcohol and a monohydric alcohol, and an esterifiable mass including an alpha, beta polycarboxylic acid containing aliphatic unsaturation between the alpha and beta carbon atoms) can be acetalized, ketalized or acetalized and ketalized to give products of outstanding properties. These copolymers can be acetalized, ketalized or acetalized and ketalized, a fact that to the best of my knowledge and belief heretofore has been unknown, even though they are infusible and are substantially insoluble in all the ordinary solvents. I have discovered that these reaction products carry with them the advantages of the cross-linked copolymer plus the important added advantage that they become sufficiently thermoplastic that, unlike the starting copolymer reactant, they can be molded under heat and pressure to a desired shape. That these reaction products would have this property, which may be described as "semi-thermoplasticity," was quite surprising and unpredictable.

In carrying my invention into effect I hydrolyze a copolymer of a vinyl ester and an unsaturated alkyd resin and cause the hydrolyzed copolymer to react with a

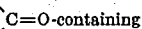

organic compound selected from the class consisting of aldehydes, ketones and mixtures of aldehydes and ketones until at least some of the hydroxyl groups have been replaced by acetal, ketal or acetal and ketal groups. For example, I may hydrolyze the copolymer to at least 10%, more particularly from 25 to 100% of that theoretically possible, and acetalize, ketalize or acetalize and ketalize the hydrolyzed copolymer until at least 10% of the hydroxyl groups of the hydrolyzed copolymer have been replaced by the corresponding acetal, ketal or acetal and ketal groups. In some cases, for instance where resistance to water is of secondary consideration, the hydrolyzed copolymer may have only a minor proportion (that is, less than 50%) of its hydroxyl groups replaced by acetal, ketal or acetal and ketal groups. For most applications, however, it is usually desirable that at least 50%, say, 60 to 100%, of the hydroxyl groups of the hydrolyzed copolymer be replaced by acetal, ketal or acetal and ketal groups. Particularly valuable products are obtained when the copolymer is hydrolyzed to from 50 to 100% of that theoretically possible and the hydrolyzed copolymer is acetalized, ketalized or acetalized and ketalized until from 75 to 100% of the hydroxyl groups of the hydrolyzed copolymer have been replaced by acetal, ketal or acetal and ketal groups.

In order that those skilled in the art better may understand how to practice this invention, the following more detailed description is given:

*Preparation of copolymer*

In effecting copolymerization between the vinyl ester and the unsaturated alkyd resin, the components are mixed and interpolymerized in the presence or absence of a polymerization catalyst, e. g., benzoyl peroxide in a concentration within the range of 0.1 to 2.0% by weight of the whole, and at normal or at elevated temperatures, e. g., at from room temperature (20° to 30° C.) to 130° C. Ordinarily I use temperatures within the range of 60° to 120° C. in causing the mixed components to interpolymerize to a cross-linked copolymer. Additional examples of polymerization catalysts which may be used are given in various copending applications of mine, for instance in copending application Serial No. 336,981, filed May 24, 1940, and assigned to the same assignee as the present invention.

In forming the copolymer reactant I prefer to use not more than 50% by weight (of the mixture) of the unsaturated alkyd resin and generally use less than 30%, e. g., from 0.1 to 10%. The particular proportions employed are dependent to a large extent upon the particular starting components and the particular properties desired in the final product.

In certain cases, instead of copolymerizing a single vinyl ester with a single or a plurality of unsaturated alkyd resins, I may copolymerize a plurality of vinyl esters with a single such unsaturated alkyd resin or with a plurality of such resins. Also, in some cases, one or more other organic materials that are copolymerizable with the vinyl ester (or esters) and such unsaturated alkyd resin (or resins) may be incorporated into the mixture and the whole copolymerized to form a cross-linked copolymer reactant of improved utility in the production of an acetalized, ketalized or acetalized and ketalized copolymer of particular properties. Examples of such modifying bodies that may be used in producing the copolymer reactant are maleate and fumarate esters of monohydric alcohols, vinyl ketones, acrylonitriles, acrylaldehydes, unsaturated ethers having at least one

grouping, etc.

Illustrative examples of vinyl esters having at least one

grouping, in addition to those previously mentioned, which may be used in preparing the starting copolymer reactant, are the vinyl esters of saturated and unsaturated, aliphatic and aromatic, monobasic and polybasic acids, more specifically the vinyl esters of the following acids: chloroacetic, propionic, bromopropionic, butyric, isobutyric, valeric, caproic, heptylic, caprylic, nonylic, capric, acrylic, alkacrylic (e. g., methacrylic, ethacrylic, etc.), crotonic, oxalic, malonic, succinic, glutaric, adipic, pimelic, suberic, azelaic, sebacic, benzoic, toluic, phenyl acetic, phthalic, terephthalic, benzoyl phthalic, benzophenone-2,4'-dicarboxylic, cinnamic, tricarballylic, tartaric, citric, lactic, etc., including the alpha unsaturated alpha beta polycarboxylic acids, e. g., maleic, monohalomaleic, fumaric, monohalofumaric, citraconic, mesaconic, acetylene dicarboxylic, aconitic, itaconic, etc. Additional examples of vinyl esters which may be used in carrying the present invention into effect are given, for example, in my above-identified co-pending application Serial No. 336,981.

The modified or unmodified polymerizable unsaturated alkyd resin reactants may be prepared in accordance with technique now well known to those skilled in the alkyd resin art. In forming these resins any polyhydric alcohol containing at least two esterifiable aliphatic hydroxyl groups, or mixtures of such alcohols, may be used. Examples of such polyhydric alcohols are ethylene glycol, di-, tri-, and tetra-ethylene glycols, propylene glycol, trimethylene glycol, thiodiglycol, glycerine, pentaerythritol, etc. Any alpha, beta polycarboxylic acid containing aliphatic unsaturation between the alpha and beta carbon atoms may be reacted with the polyhydric alcohol or alcohols to form the polymerizable alpha, beta unsaturated alkyd resin. Examples of such alpha, beta unsaturated polycarboxylic acids are maleic, monohalomaleic, fumaric, monohalofumaric, citraconic, mesaconic, acetylene dicarboxylic, aconitic, etc. If available, the anhydrides of these polycarboxylic acids may be employed.

In some cases instead of using an unmodified unsaturated alkyd resin I may use a polymerizable unsaturated alkyd resin that has been internally modified by replacing a part of the unsaturated polycarboxylic acid with a nonethylenic polycarboxylic acid, for example a saturated aliphatic polycarboxylic acid such, for instance, as succinic, adipic, glutaric, pimelic, sebacic, azelaic, suberic, tricarballylic, etc., an aromatic polycarboxylic acid, e. g., phthalic, terephthalic, benzoyl phthalic, etc. Anhydrides of such acids may be used, if available. The terms "polycarboxylic acid" and "dicarboxylic acid" as used generally herein and in the appended claims with reference to nonethylenic polycarboxylic acids and alpha, beta unsaturated polycarboxylic acids are intended to include within their meanings the anhydrides of the acids.

The unsaturated alkyd resin forming a component of the copolymer may be modified in still other ways. For example, the polymerizable esterification product may be internally modified by (1) replacing part of the polycarboxylic acid (or acids) with a monocarboxylic acid, e. g., acetic, propionic, benzoic, toluic, etc., acids, or (2) replacing part of the polyhydric alcohol with a monohydric alcohol, e. g., methyl, ethyl, propyl, butyl, amyl, isoamyl, benzyl, phenyl ethyl, etc., alcohols.

The term "unsaturated alkyd resin" as used generally herein and in the appended claims is intended to include within its meaning both unmodified esterification products of a polyhydric alcohol with an alpha, beta unsaturated polycarboxylic acid and polymerizable esterification products of the said components which have been modified, for example, as above briefly described.

More specific examples of polymerizable alpha, beta unsaturated alkyd resins which may be used in forming the copolymer reactant are: ethylene glycol fumarate, glyceryl maleate, glyceryl fumarate, glyceryl phthalate fumarate, diethylene glycol maleate, tetraethylene glycol maleate acetate, diethylene glycol citraconate, ethylene glycol citraconate, tetramethylene glycol monochloromaleate, trimethylene glycol fumarate modified with 2-ethyl hexanol, ethylene glycol maleate succinate, glyceryl maleate phthalate, pentaerythritol maleate, pentaerythritol maleate phthalate, etc.

*Treatment of copolymer*

The cross-linked copolymers may be partially or completely hydrolyzed and thereafter acetalized, ketalized or acetalized and ketalized; or, the partial or complete acetalization, ketalization or acetalization and ketalization of the copolymer may be caused to take place simultaneously with the partial or complete hydrolysis of the copolymer.

When the copolymer is hydrolyzed separately from the acetalization, ketalization or acetalization and ketalization reaction, this may be done, for example, by heating the copolymer with water and a suitable catalyst, examples of which are strong alkalies (e. g., sodium and potassium hydroxides, tetra-alkyl ammonium hydroxides, etc.) and acidic bodies (e. g., mineral acids such as hydrochloric, sulfuric, etc., and acidic salts such as aluminum chloride, zinc chloride, etc.) until the desired degree of hydrolysis has been effected. I prefer to use an acid catalyst. The hydrolyzed product, with or without first being purified (or partially re-esterified if the hydrolysis has been carried farther than desired), then is acetalized, ketalized or acetalized and ketalized by causing it to react under acid conditions with an aldehyde, a ketone, a mixture of different aldehydes, a mixture of different ketones, or a mixture of a single aldehyde and a single ketone or of a plurality of different aldehydes and different ketones. The reaction is continued until the desired percentage of hydroxyl groups in the hydrolyzed copolymer have been replaced by acetal, ketal or acetal and ketal groups. The solid reaction product then is isolated from the reaction mass, washed and dried.

Preferably I conduct the acetalization, ketalization or acetalization and ketalization reaction, under acid conditions, simultaneously with the hydrolysis of the copolymer. This may be done, for example, by treating the copolymer with an acidic catalyst (examples of which were given in the preceding paragraph) and an organic compound containing or engendering an active carbonyl

grouping, e. g., aldehydes, ketones, etc. Preferably the reaction is carried out in the presence of a liquid medium adapted to cause a molecular dispersion of the finished product, e. g., in acetic acid, propionic acid, liquid (or liquefiable) monohydric alcohols, e. g., ethyl alcohol, butyl alcohol, amyl alcohol, etc., mixtures of liquid alcohols, acids and esters, etc. To shorten the time required for treating the copolymer, it is desirable to maintain the reactants at an elevated temperature, say 60° to 100° C., or above, the exact temperature depending more or less upon the boiling point of the mixture. Ordinarily the reaction is carried out under reflux at or approaching the boiling point of the reaction mass.

After the conjoint hydrolysis and acetalization, ketalization or acetalization and ketalization reaction has been carried to the desired stage as determined by analysis or by previous experience, the reaction mass usually is mixed with water to which may be added, if desired, a neutralizing agent, e. g., ammonia, sodium and potassium hydroxides and carbonates, etc., for the acidic bodies. This causes coagulation of the treated copolymer, which thereafter is washed until free of water-soluble materials and then dried. The resulting products may be shaped by the application of heat, pressure or heat and pressure.

As $\diagdown\!\!\!\!\diagup\text{C=O-containing}$ compounds that are caused to react with the polymer I may use any aldehyde or ketone or any compound engendering an aldehyde or a ketone, that is, a compound which will be converted to an aldehyde or a ketone during the reaction between the starting components. Examples of such compounds are formaldehyde, acetaldehyde, propionaldehyde, butyraldehyde, paraformaldehyde, paraldehyde, trioxymethylene, acrolein, methacrolein, crotonaldehyde, benzaldehyde, cinnamic aldehyde, anisaldehyde, p-methoxy phenyl acetaldehyde, furfural, acetone, chloroacetone, methylvinyl ketone, divinyl ketone, methyl ethyl ketone, acetophenone, benzophenone, quinone, tetrahydroquinone, benzil, benzoyl acetone, acetyl dibenzoyl methane, benzal acetophenone, mesityl oxide, shogaol, cyclohexanone, vanillin zingerone, alpha-oxy-tetrahydronaphthalene, paeonol, etc.

The properties, for example hardness, of the final product are considerably influenced by the particular $\diagdown\!\!\!\!\diagup\text{C=O-containing}$ compound used. Thus, for the same cross-linked copolymer and the same degree of hydrolysis and acetalization, formaldehyde will yield a harder acetalized copolymer than propionaldehyde. On the other hand, acrolein and furfural yield more solvent-resistant copolymers than formaldehyde. Mixtures of different aldehydes or of different ketones or of aldehydes and ketones may be used in certain cases to impart particular properties to the treated product. In such modifications, the mixed $\diagdown\!\!\!\!\diagup\text{C=O-containing}$ compounds may be caused to react together upon the hydrolyzed copolymer, the hydrolysis being carried out first and acetalization, ketalization or acetalization and ketalization afterwards, or hydrolysis and condensation with the mixed treating agents may be carried out simultaneously. Or, the hydrolyzed copolymer may be reacted first with one $\diagdown\!\!\!\!\diagup\text{C=O-containing}$ compound and then with another. Or, simultaneous hydrolysis and partial acetalization, ketalization or acetalization and ketalization with one treating agent $\diagdown\!\!\!\!\diagup\text{C=O-containing}$ compound) may be caused to take place, followed by more complete reaction with a different $\diagdown\!\!\!\!\diagup\text{C=O-containing}$ compound.

The properties of the final product depend upon many factors, one of which is the composition of the starting copolymer reactant. For example, a cross-linked copolymer of 0.1 per cent ethylene glycol maleate and 99.9% vinyl acetate yields an acetalized copolymer of lower softening point than does a cross-linked copolymer of 10% ethylene glycol maleate and 90% vinyl acetate. The concentration of the polymerization catalyst and the temperature of polymerization used in the production of the copolymer reactant also influence the properties of the final product. High catalyst concentration and (or) high polymerization temperature yield copolymers of lower molecular weight than result from lower amounts of catalyst and (or) lower polymerization temperatures. These differences are reflected in the reaction products of the copolymer with the $\diagdown\!\!\!\!\diagup\text{C=O-containing}$ compound.

By varying the time and temperature of reaction and the concentration of the catalytic agent and of the $\diagdown\!\!\!\!\diagup\text{C=O-containing}$ compound, it is possible to vary the extent of hydrolysis and the reaction of the copolymer with the $\diagdown\!\!\!\!\diagup\text{C=O-containing}$ compound. If the hydrolysis is carried out in the absence of a $\diagdown\!\!\!\!\diagup\text{C=O-containing}$ compound, the extent of hydrolysis also may be controlled by carrying hydrolysis farther than is ultimately desired and then re-esterifying the excess hydroxyl groups. In re-esterifying, a different acid than that produced in the hydrolysis may be used thereby further to alter the properties of the final product.

The properties of the final product also may be varied by varying the extent of hydrolysis, the extent of the reaction with the $\diagdown\!\!\!\!\diagup\text{C=O-containing}$ compound and the ratio of hydroxyl groups to substituent groups and the ratio of each to the number of ester groups remaining in the molecule. For example, two products with entirely different properties will result from the same cross-linked copolymer reactant if, in one case, the hydrolysis is carried to 90% of that theoretically possible and then 45% of the available hydroxyl groups are acetalized, ketalized or acetalized and ketalized while in the other case the hydrolysis is carried to 45% of that theoretically possible and then 90% of the available hydroxyl groups are acetalized, ketalized or acetalized and ketalized. This will be more clearly understood from a consideration of Fig. 1 of the accompanying drawing showing a triangular coordinate graph and from the following discussion of the same.

The point F on this graph designates the starting copolymer reactant, which is 100% non-hydrolyzed and non-acetalized, that is, a copolymer which has not been hydrolyzed and has not been treated with a $$\diagdown C=O\text{-containing}$$

compound; the point E designates a 100% hydrolyzed copolymer; and the point A, a 100% acetalized, ketalized or acetalized and ketalized copolymer. The area I, designated by the triangle ABC, covers compositions of particular utility in the production of molding compositions and electrically insulating materials. Those compositions within this area that contain less than 20% hydroxyl groups, of the maximum theoretically possible on complete hydrolysis, are particularly useful in the production of wire enamels. The area II, designated by the triangle CDF, covers compositions having properties more closely approaching those of the starting copolymer reactant than those compositions covered by areas I, III and IV. In general, such compositions require higher heat and pressure for shaping than those of the other areas. The area III, designated by the triangle BED, covers compositions of lesser resistance to water than the compositions of the other areas. These compositions are more easily dispersed in water. They are particularly adapted for use in the production of water-dispersible and hydroxylated-solvent-dispersible adhesives. The area IV, designated by the triangle BCD (middle section of the graph), covers compositions having properties intermediate those falling within the other areas. The properties of any particular composition within this area approach those of the compositions falling within the area to which it is nearest.

It will be understood, of course, that the deductions which may be made from this graph are only general and that other variable influences in the production of the treated copolymer may cause some variations. This graph, however, does show the wide variations that are possible in the preparation of the new synthetic compositions of this invention and, in a general way, how the properties of the final product may be varied by varying the extent of hydrolysis and the extent of the reaction with the $$\diagdown C=O\text{-containing}$$

compound.

The properties of these new artificial masses may be varied in still other ways. For example, their properties may be varied by carrying out the reaction with the $$\diagdown C=O\text{-containing}$$

compound in the presence of other reactants such, for instance, as one or more organic compounds capable of forming a methylol derivative as an intermediate during the resin formation or one or more other compounds capable of reacting with the $$\diagdown C=O\text{-containing}$$

compound or with the reaction product of the $$\diagdown C=O\text{-containing}$$

compound and the hydrolyzed copolymer. Examples of such modifying reactants which may be used as such, or in the form of their methylol or methylene derivatives are phenols, including halogenated (e. g., chlorinated, brominated, etc.) and non-halogenated monohydric and polyhydric phenols, e. g., phenol itself and its homologues such as ortho, meta and para cresols, the xylenols, the butyl, amyl and hexyl phenols, tertiary amyl phenol, cyclohexyl phenol, phenyl phenol, styryl phenol, indene phenol, coumar phenol, resorcinol, chlorophenol, chlorophenyl phenol, chlorostyryl phenol, etc.; hydroxy aromatic esters, e. g., hydroxy benzoates, hydroxy phenyl acetates, hydroxy phenyl propionates, hydroxy cinnamates, etc.; hydroxy aromatic ethers, e. g., hydroquinone mono-ethers, guiacols, etc.; monohydric and polyhydric alcohols, e. g., ethyl propyl, isopropyl, butyl, amyl, etc., alcohols, ethylene glycol, diethylene glycol, glycerine, pentaerythritol, trimethylol nitro methane, etc.; amides, both monoamides and polyamides, e. g., formamide, acetamide, stearamide, malonic diamide, succinic diamide, adipic diamide, phthalic diamide, citric triamide, itaconic diamide, sulfonamides such as toluene sulfonamide, benzamide, urea and its homologues and derivatives and substances of the nature of urea, e. g., thiourea, methyl urea, tertiary amyl urea, phenyl thiourea, guanidine, biguanide, guanyl urea, triazines, pseudothiourea, melamine, etc.; amines, e. g., ethylene diamine, aniline, phenylene diamine, amino phenols, etc.

The following more specific examples are given in order to illustrate more clearly how the present invention may be carried into effect. All parts are by weight.

*Example 1*

Seventeen parts of a cross-linked copolymer of 95 parts vinyl acetate and 5 parts ethylene glycol maleate were reacted for 192 hours at 70° C. with Parts
Aqueous formaldehyde (approximately 37.1%
  HCHO) _____ 10
Concentrated sulfuric acid_____ 1
Acetic acid_____ 100

This resulted in a viscous, homogeneous dispersion of the acetalized copolymer in acetic acid. On precipitating in water containing sufficient ammonia to neutralize the mineral acid and washing the precipitated copolymer until free from water-soluble components, followed by drying, a tough, cream-colored, thermoplastic material, which fused at 150° C., was obtained.

*Example 2*

Seventeen parts of a cross-linked copolymer of 90 parts vinyl acetate and 10 parts diethylene glycol maleate acetate were reacted for 192 hours at 70° C. with Parts
Aqueous formaldehyde (approximately 37.1%
  HCHO) _____ 10
Concentrated hydrochloric acid_____ 1
Acetic acid_____ 100

This yielded an opalescent viscous gel which, after precipitation and washing, gave a very tough, thermoplastic material that knitted together when heated at 150° C.

*Example 3*

Seventeen parts of a cross-linked copolymer of 90 parts vinyl acetate and 10 parts diethylene glycol maleate phthalate were reacted for 192 hours at 70° C. with

| | Parts |
|---|---|
| Aqueous formaldehyde (approximately 37.1% HCHO) | 10 |
| Concentrated sulfuric acid | 1 |
| Acetic acid | 50 | yielding an opalescent viscous solution. After precipitation and washing, a very tough, cream-colored, thermoplastic material, of very high softening point was obtained.

*Example 4*

Seventeen parts of a cross-linked copolymer of 90 parts vinyl acetate and 10 parts tetraethylene glycol maleate pthalate were reacted for 192 hours at 70° C. with

| | Parts |
|---|---|
| Aqueous formaldehyde (approximately 37.1% HCHO) | 10 |
| Concentrated sulfuric acid | 1 |
| Acetic acid | 50 |

This resulted in a very viscous, clear, amber solution which, after precipitation and washing, gave a tough, cream-colored resin of high softening point.

*Example 5*

Seventeen parts of a cross-linked copolymer of 90 parts vinyl acetate and 10 parts tetraethylene glycol maleate were reacted for 192 hours at 70° C. with

| | Parts |
|---|---|
| Aqueous formaldehyde (approximately 37.1% HCHO) | 10 |
| Concentrated hydrochloric acid | 1 |
| Acetic acid | 50 | yielding a clear, viscous, amber solution. After precipitating and washing, a tough, cream-colored, thermoplastic material of high softening point was obtained.

*Example 6*

Seventeen parts of a cross-linked copolymer of 95 parts vinyl acetate and 5 parts ethylene glycol maleate were reacted for 192 hours at 70° C. with

| | Parts |
|---|---|
| Butanal (butyraldehyde) | 10 |
| Water | 3 |
| Concentrated hydrochloric acid | 1 |
| Acetic acid | 50 |

This resulted in a dark solution of low viscosity which, after precipitation and washing, gave a dark rubbery material that became very soft when heated at 150° C.

*Example 7*

Seventeen parts of a cross-linked copolymer of 90 parts vinyl acetate and 10 parts diethylene glycol maleate acetate were reacted for 192 hours at 70° C. with

| | Parts |
|---|---|
| Butanal | 10 |
| Water | 3 |
| Concentrated hydrochloric acid | 1 |
| Acetic acid | 50 | yielding a viscous, dark-colored solution. Precipitation of the resin and washing of the precipitated resin until free from water-soluble components gave a dark, rubbery, thermoplastic material.

*Example 8*

Seventeen parts of a cross-linked copolymer of 90 parts vinyl acetate and 10 parts diethylene glycol maleate phthalate were reacted for 192 hours at 70° C. with

| | Parts |
|---|---|
| Butanal | 10 |
| Water | 3 |
| Concentrated sulfuric acid | 1 |
| Acetic acid | 50 |

This produced a very viscous, dark-colored solution which, after precipitation and washing, gave a soft, rubbery thermoplastic resin.

*Example 9*

Seventeen parts of a cross-linked copolymer of 90 parts vinyl acetate and 10 parts tetraethylene glycol maleate phthalate were reacted for 192 hours at 70° C. with

| | Parts |
|---|---|
| Butanal | 10 |
| Water | 3 |
| Concentrated hydrochloric acid | 1 |
| Acetic acid | 50 | yielding a viscous, brownish solution which, after precipitation and washing, gave a soft, rubbery, thermoplastic resin.

*Example 10*

Seventeen parts of a cross-linked copolymer of 90 parts vinyl acetate and 10 parts tetraethylene glycol maleate were reacted for 192 hours at 70° C. with

| | Parts |
|---|---|
| Butanal | 10 |
| Water | 3 |
| Concentrated sulfuric acid | 1 |
| Acetic acid | 50 |

This yielded a viscous, brown solution which, after precipitation and washing, produced a soft, rubbery, thermoplastic resin.

*Example 11*

Seventeen parts of a cross-linked copolymer of 90 parts vinyl acetate and 10 parts diethylene glycol maleate modified with 2-ethyl hexanol were reacted for 192 hours at 70° C. with

| | Parts |
|---|---|
| Aqueous formaldehyde (approximately 37.1% HCHO) | 10 |
| Concentrated hydrochloric acid | 1 |
| Acetic acid | 100 |

The resulting mass was a viscous, amber-colored solution which, after precipitation and washing, yielded an exceptionally hard, tough, thermoplastic resin having a high softening point.

*Example 12*

Seventeen parts of a cross-linked copolymer of 90 parts vinyl acetate and 10 parts diethylene glycol maleate modified with 2-ethyl hexanol were reacted for 120 hours at 70° C. with

| | Parts |
|---|---|
| Aqueous formaldehyde (approximately 37.1% HCHO) | 18 |
| Concentrated sulfuric acid | 1 |
| Acetic acid | 100 | yielding a viscous, amber-colored solution which, after precipitation and washing, gave a hard, thermoplastic material.

*Example 13*

Seventeen parts of a cross-linked copolymer of 95 parts vinyl acetate and 5 parts ethylene glycol maleate were reacted for 192 hours at 70° C. with

| | Parts |
|---|---|
| Acetone | 8 |
| Water | 4 |
| Concentrated sulfuric acid | 1 |
| Acetic acid | 100 |

The resulting mass was precipitated, washed and dried, yielding a fibrous, cream-colored, thermoplastic material that fused and became rubbery when heated at 150° C.

Example 14

Six parts of a cross-linked copolymer of 90 parts vinyl acetate and 10 parts diethylene glycol maleate acetate were reacted for 192 hours at 70° C. with

| | Parts |
|---|---|
| Methyl ethyl ketone | 4 |
| Water | 2 |
| Concentrated hydrochloric acid | 1 |
| Acetic acid | 100 |

After precipitation, washing and drying, a hard thermoplastic resin was obtained. This resin became soft and sticky when heated at 150° C.

Example 15

Seventeen parts of a cross-linked copolymer of 90 parts vinyl acetate and 10 parts diethylene glycol maleate phthalate were reacted for 192 hours at 70° C. with

| | Parts |
|---|---|
| Para-hydroxy acetophenone | 15 |
| Water | 4 |
| Concentrated hydrochloric acid | 1 |
| Acetic acid | 100 | which, after precipitation, washing and drying, yielded a horny thermoplastic resin that became soft and sticky when heated at 150° C.

Example 16

Seventeen parts of a cross-linked copolymer of 90 parts vinyl acetate and 10 parts tetraethylene glycol maleate phthalate were reacted for 192 hours at 70° C. with

| | Parts |
|---|---|
| Chloroacetone | 11 |
| Water | 4 |
| Concentrated sulfuric acid | 1 |
| Acetic acid | 100 | yielding a straw-colored solution which, after precipitation, washing and drying gave a hard, tough resin that fused readily at 150° C.

Example 17

Seventeen parts of a cross-linked copolymer of 90 parts vinyl acetate and 10 parts tetraethylene glycol maleate were reacted for 192 hours at 70° C. with

| | Parts |
|---|---|
| Acetyl acetone | 6 |
| Water | 5 |
| Concentrated sulphuric acid | 1 |
| Acetic acid | 100 |

This resulted in a viscous, straw-colored solution. Treatment of the solution to precipitate the resin, and washing and drying the precipitated resin, yielded a hard, tough thermoplastic material which was rubbery in its characteristics when heated at 150° C. but fused upon heating at 175° C.

Example 18

Seventeen parts of a cross-linked copolymer of 90 parts vinyl acetate and 10 parts diethylene glycol maleate modified with 2-ethyl hexanol were reacted for 120 hours at 70° C. with

| | Parts |
|---|---|
| Acetone | 8 |
| Water | 4 |
| Concentrated hydrochloric acid | 1 |
| Acetic acid | 100 | yielding a honey-colored viscous solution. Precipitation, washing and drying gave a horny thermoplastic resin that was softer than the acetalized interpolymers of Examples 11 and 12.

Example 19

Ten parts of a cross-linked copolymer of 95 parts vinyl acetate and 5 parts ethylene glycol maleate were reacted for 192 hours at 70° C. with

| | Parts |
|---|---|
| Aqueous formaldehyde (approximately 37.1% HCHO) | 10 |
| Phenol | 5 |
| Concentrated sulfuric acid | 1 |
| Acetic acid | 100 | which, after precipitation, washing and drying, yielded a resin that would cure, when maintained at temperatures of the order of 80° to 100° C., to a non-thermoplastic resin.

Example 20

Seventeen parts of a cross-linked copolymer of 90 parts vinyl acetate and 10 parts diethylene glycol maleate phthalate were reacted for 192 hours at 70° C. with

| | Parts |
|---|---|
| Aqueous formaldehyde (approximately 37.1% HCHO) | 18 |
| Hydroquinone | 11 |
| Concentrated sulfuric acid | 1 |
| Acetic acid | 100 | yielding a dark-colored, pasty mass which, after washing and drying, resembled the product of Example 19.

Example 21

Seventeen parts of a cross-linked copolymer of 90 parts vinyl acetate and 10 parts tetraethylene glycol maleate phthalate were reacted at 70° C. for 192 hours with

| | Parts |
|---|---|
| Aqueous formaldehyde (approximately 37.1% HCHO) | 18 |
| Benzyl p-hydroxy benzoate | 15 |
| Concentrated sulfuric acid | 1 |
| Acetic acid | 100 | yielding a honey-colored jelly which, after washing and drying, was converted into a rubbery resin that maintained this property over a wide temperature range. It was still rubbery in nature when heated at 150° C. but fused upon heating at 175° C.

Example 22

Seventeen parts of a cross-linked copolymer of 90 parts vinyl acetate and 10 parts tetraethylene glycol maleate phthalate were reacted for 192 hours at 70° C. with

| | Parts |
|---|---|
| Aqueous formaldehyde (approximately 37.1% HCHO) | 18 |
| Methyl p-hydroxy benzoate | 15 |
| Concentrated sulfuric acid | 1 |
| Acetic acid | 100 |

This resulted in a honey-colored jelly which, after washing and drying, gave a hard, cream-colored resin of high softening point. It fused when heated at 175° C.

Example 23

Seventeen parts of a cross-linked copolymer of 90 parts vinyl acetate and 10 parts tetraethylene glycol maleate were reacted for 192 hours at 70° C. with

|   | Parts |
|---|---|
| Aqueous formaldehyde (approximately 37.1% HCHO) | 18 |
| Phenethyl salicylate | 24 |
| Concentrated hydrochloric acid | 1 |
| Acetic acid | 100 |

After precipitation, washing and drying, the viscous straw-colored solution resulting from the reaction yielded a rubbery thermoplastic material that became very soft at 150° C.

Example 24

Seventeen parts of a cross-linked copolymer of 90 parts vinyl acetate and 10 parts tetraethylene glycol maleate phthalate were reacted for 192 hours at 70° C. with

|   | Parts |
|---|---|
| Butanal | 16 |
| Ethyl p-hydroxy benzoate | 17 |
| Concentrated hydrochloric acid | 1 |
| Water | 4 |
| Acetic acid | 100 |

This yielded a viscous, dark-colored solution which, after precipitation, washing and drying, gave a very soft, sticky resin that was almost liquid at 150° C.

Example 25

Seventeen parts of a cross-linked copolymer of 90 parts vinyl acetate and 10 parts tetraethylene glycol maleate were reacted for 192 hours at 70° C. with

|   | Parts |
|---|---|
| Aqueous formaldehyde (approximately 37.1% HCHO) | 13 |
| Para-chlorophenol | 13 |
| Concentrated hydrochloric acid | 1 |
| Acetic acid | 100 |

This yielded a viscous, straw-colored solution that was almost jelly-like. After precipitation, washing and drying, a hard tough resin that fused when heated at 175° C. was obtained.

Example 26

Seventeen parts of a cross-linked copolymer of 90 parts vinyl acetate and 10 parts tetraethylene glycol maleate phthalate were reacted for 192 hours at 70° C. with

|   | Parts |
|---|---|
| Aqueous formaldehyde (approximately 37.1% HCHO) | 18 |
| Para-chlor-meta-cresol | 14 |
| Concentrated hydrochloric acid | 1 |
| Acetic acid | 100 |

This yielded a pink-colored, opaque dispersion which, after precipitation, washing and drying gave a very tough, hard resin. It showed evidence of fusion when heated at 175° C.

Example 27

Seventeen parts of a cross-linked copolymer of 90 parts vinyl acetate and 10 parts tetraethylene glycol maleate phthalate were reacted for 192 hours at 70° C. with

|   | Parts |
|---|---|
| Aqueous formaldehyde (approximately 37.1% HCHO) | 18 |
| Acetamide | 12 |
| Concentrated sulfuric acid | 1 |
| Acetic acid | 100 | yielding a viscous, light-yellow solution which, after precipitation, washing and drying, gave a very tough, white resin that fused at 175° C without discoloration.

Example 28

Seventeen parts of a cross-linked copolymer of 90 parts vinyl acetate and 10 parts diethylene glycol maleate phthalate were reacted for 192 hours at 70° C. with

|   | Parts |
|---|---|
| Aqueous formaldehyde (approximately 37.1% HCHO) | 18 |
| Urea | 6 |
| Concentrated hydrochloric acid | 1 |
| Acetic acid | 100 |

This resulted in a viscous, light-yellow solution which, after precipitation, washing and drying, gave a pure white, semi-thermoplastic resin. This resin could be shaped at 175° C. without discoloration.

Example 29

Seventeen parts of a cross-linked copolymer of 90 parts vinyl acetate and 10 parts diethylene glycol maleate phthalate were reacted for 192 hours at 70° C. with

|   | Parts |
|---|---|
| Aqueous formaldehyde (approximately 37.1% HCHO) | 18 |
| Itaconic diamide | 13 |
| Concentrated sulfuric acid | 1 |
| Acetic acid | 100 | yielding a light brown, viscous solution, which gave a tough, white resin after precipitation and washing. This resin was difficultly thermoplastic. It could be fused and worked at 175° C.

Example 30

Seventeen parts of a cross-linked copolymer of 90 parts vinyl acetate and 10 parts tetraethylene glycol maleate phthalate were reacted for 192 hours at 70° C. with

|   | Parts |
|---|---|
| Aqueous formaldehyde (approximately 37.1% HCHO) | 18 |
| Toluene sulfonamide | 34 |
| Concentrated sulfuric acid | 1 |
| Acetic acid | 100 |

This yielded an almost colorless, viscous solution which, after precipitation, washing and drying, gave a very hard, white resin that fused when heated at 175° C.

Example 31

Seventeen parts of a cross-linked copolymer of 90 parts vinyl acetate and 10 parts tetraethylene glycol maleate were reacted for 192 hours at 70° C. with

|   | Parts |
|---|---|
| Butanal | 15 |
| Water | 5 |
| Phthalimide | 29 |
| Concentrated hydrochloric acid | 1 |
| Acetic acid | 100 | yielding a dark-colored paste which, after washing and drying, gave a rubbery, thermoplastic resin.

*Example 32*

Seventeen parts of a cross-linked copolymer of 90 parts vinyl acetate and 10 parts diethylene glycol maleate modified with 2-ethyl hexanol were reacted for 120 hours at 70° C. with

| | Parts |
|---|---|
| Aqueous formaldehyde (approximately 37.1% HCHO) | 18 |
| Toluene sulfonamide | 34 |
| Concentrated sulfuric acid | 1 |
| Acetic acid | 100 |

This resulted in a viscous, honey-colored solution which, after precipitation, washing and drying produced a hard, brittle, cream-colored thermoplastic resin.

The fundamental synthetic compositions of this invention may be varied widely by introducing various modifying bodies during or after reaction of the hydrolyzed copolymer with the

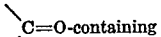

compound. These modifying bodies may take the form of high molecular weight bodies with or without resinous characteristics, for example hydrolyzed wood products, lignin, proteins, protein-aldehyde condensation products, furfural condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the super-polyamides, etc.

Other modifying bodies of a plasticizing or softening nature also may be suitably incorporated into the fundamental synthetic materials of this invention. Examples of such modifying agents are the phthalate esters, for instance dimethyl phthalate, diethyl phthalate, dibutyl phthalate, etc.; the phosphate esters, e. g., tricresyl phosphate, triphenyl phosphate, etc.; glycol di-esters, e. g., glycol di-hexoate, glycol acetate hexoate, glycol acetate benzoate, glycol diacetoacetate, etc.; esters of furfuryl and tetra-hydrofurfuryl alcohols, e. g., furfuryl and tetrahydrofurfuryl maleates, itaconates, fumarates, salicylates, phthalates, etc.; the amide esters of alkanol amines, e. g., esters corresponding to the structural formulas RCONHCR$_2$CH$_2$OCOR, RCON(CR$_2$CR$_2$OCOR)$_2$ and N(CR$_2$CR$_2$OCOR)$_3$ in which formulas R represents hydrogen, alkyl or aryl radicals; the semi-amides of polyesters, e. g., semi-amides corresponding to the structural formulas

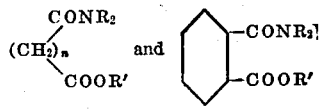

in which formulas $n$ represents 1 or more, R represents hydrogen, alkyl or aryl radicals and R' represents alkyl or aryl radicals; imides, e. g., succinimide, phthalimide, etc.; and similar substances.

The acetalized, ketalized or acetalized and ketalized interpolymers of this invention may be stabilized against discoloration and made more resistant to decomposition under heat, particularly in the presence of air, by incorporating into the reaction mass or into the intermediate or finished products various inhibiting or stabilizing agents. Examples of such agents are phenolic bodies, e. g., phenol, resorcinol, catechol, hydroquinone, pyrogallol, phloroglucinol, alpha- and beta-naphthol, cresols, xylenols, carvacrol, thymol, para-tertiary butyl phenol, para-tertiary amyl phenol, para-phenyl phenol, etc.; amines, e. g., ethyl, propyl, butyl and amyl amines and higher members of the homologous series, methyl amyl, ethylhexyl, iso-propylbutyl amines, etc., alkanol amines, e. g., mono-, di- and tri-ethanol amines, etc., poly-amines, e. g., ethylene diamine, tri- and tetra-methylene diamines, etc., aromatic primary, secondary and tertiary amines, e. g., phenyl, naphthyl, naphthyl phenyl amines and substitution products of such amines, e. g., benzyl amine, ethyl naphthyl amine, diphenyl methyl amine, etc.; amides, e. g., acetamide, benzamide, toluene sulfonamide, succinic diamide, etc.; reaction products of phenols, of amines and of amides, e. g., phenol-aldehyde condensation products, amine-aldehyde condensation products, amide-aldehyde condensation products; and similar substances. The chosen stabilizer (inhibitor) depends largely upon the particular acetalized, ketalized or acetalized and ketalized interpolymer to be stabilized and the particular service application of the finished product. Any suitable amount of stabilizer may be used, but ordinarily only a relatively small proportion, for example from about 0.01 to 3.0 per cent by weight of the acetalized, ketalized or acetalized and ketalized interpolymer is employed.

Dyes, pigments and opacifiers (e. g., barium sulphate, zinc sulfide, titanium compound such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, cadmium, calcium, etc., waxes such as carnauba, high melting point paraffin waxes, etc., may be added to facilitate molding of the compositions. Various fillers may be used to provide a wide variety of molding compositions. The particular filler depends upon the particular application for which the molded article is to be employed. As fillers may be used, for instance, bleached or unbleached wood flour, alpha cellulose in flock form, sheets or cuttings of paper, cloth, canvas, etc., asbestos in powdered or long or short fiber length including defibrated asbestos, powdered or flaked mica, wood chips, short or long wood fibers, synthetic or natural continuous threaded fibers, glass fibers in continuous filament or fabric (woven or felted) form, etc. The filled or unfilled synthetic compositions may be densified by working in a Banbury mixer, or by rolling, pelleting or other means, followed by grinding and screening to the desired particle size. The molding compositions may be molded, extruded or injected at elevated temperatures, e. f., 125° to 225° C. and at suitable pressures, e. g., at about 1000 to 20,000 pounds per square inch, usually between about 2000 and 400 pounds per square inch in compression molding.

In addition to their use in molding compositions and in the production of molded articles, these new plastic compositions may be dissolved or dispersed in solvents or swelling agents, e. g., dioxane, furfural, furfural alcohol, phenol, cresols, phenol alcohols, oxygenated solvents such as ketones, liquid aliphatic acids and alcohols, or in mixtures of such materials, to form liquid coating and impregnating compositions. Such liquid compositions also may contain oils, e. g., linseed oil, Chinawood oil, perilla oil, soya bean oil, etc., pigments, plasticizers, driers and other addition agents commonly used in the production of paints, varnishes, lacquers, enamels, etc. Coating compositions made from these new synthetic materials (particularly those which are highly acetalized, ketalized or acetalized and ketalized), when applied to a base member, e. g., metals, and air-dried or baked, are strong, tough, abrasion-resistant, have good adhesive properties and excellent resistance to heat, water and organic solvents.

As illustrative of how the synthetic compositions of this invention may be used in the field of electrical insulation, the following examples are cited: A liquid coating composition comprising an acetalized, a ketalized or an acetalized and ketalized interpolymer of the kind above described and a suitable volatile solvent is applied to a metallic conductor such as plain or tinned copper wire, for example by passing the wire through a bath of the coating composition. Thereafter the coated wire is passed through a suitably heated oven to vaporize the solvent and to convert the coating to a hard, tough, flexible, abrasion-, moisture- and solvent-resistant state. In some cases it may be desirable to wrap the conductor with a fibrous material, e. g., asbestos in defibrated or other form or with glass fibers, cotton cloth, paper, etc., before treating it with the solution. A further procedure is to coat and at least partly impregnate the wrapped conductor with a syrupy solution of the treated interpolymer, wind the thus insulated conductor into the desired coil, and then heat the wound coil to evaporate the solvent and to harden the residual product.

Sheet insulation may be prepared by treating woven or felted organic or inorganic fabrics or paper with these new synthetic materials. Sheet insulation also may be prepared by binding together flaky inorganic substances with the new materials of this invention. For example, mica flakes may be cemented and bonded together with an acetalized, a ketalized or an acetalized and ketalized interpolymer to form laminated mica products.

In addition to their use as electrically insulating materials the products of this invention have a wide variety of other applications. For instance, they may be used in the production of so-called "safety glass," wherein superimposed layers of glass are firmly united with a binder comprising one or more of these new synthetic materials. Particularly suitable for such applications are organic plastic materials produced by reaction of butyraldehyde with a hydrolyzed copolymer of vinyl acetate and an unsaturated alkyd resin. In such plastic materials the hydroxyl groups of the hydrolyzed copolymer are replaced by butyral groups.

The modified or unmodified products of this invention have a wide variety of other uses, for instance in making interior finishing and construction materials for homes, offices, etc., particularly where high-impact-strength and shock-resistant structures are desired. They also may be molded or otherwise suitably shaped to produce buttons, clock cases, radio cabinets, household utensils, decorative novelties, etc. Some of the synthetic materials of this invention are fiber-forming, that is, they can be drawn into continuous filaments. Such filaments may be made into felted or woven fabrics. The highly acetalized, ketalized or acetalized and ketalized interpolymers are especially adapted for use as water-repellents and sizings when applied to wood or the like, or to fibrous materials such as silk, cotton, wool, synthetic organic fibers, etc., in continuous filament, fabric or other form. The synthetic materials of this invention also may be used in making laminated fibrous sheet materials wherein superimposed layers of cloth, paper, etc., are firmly bonded together with the synthetic material; as impregnates for electrical coils and other electrical devices; as insulation for motors, generators and other dynamo-electric machines, e. g., as insulation for coil windings, as slot insulation, in the form of sleevings over electrical connections, as separators between running and starting coil windings, etc.

Fig. 2 of the drawing is a cross sectional view of an electrical conductor provided with insulation comprising synthetic compositions of the character described and claimed herein.

What I claim as new and desire to secure by Letters Patent of the United States is:

1. The process of preparing new synthetic compositions which comprises effecting reaction between ingredients comprising (1) a hydrolyzed copolymer of a plurality of copolymerizable materials, one of which is a vinyl ester and another of which is an unsaturated alkyd resin obtained by reaction of a substance comprising polyhydric alcohol with a substance comprising alpha, beta polycarboxylic acid containing aliphatic unsaturation between the alpha and beta carbon atoms, and (2) a $$\diagdown C{=}O\text{-containing}$$

organic compound selected from the class consisting of aldehydes, ketones and mixtures of aldehydes and ketones.

2. The process of preparing new synthetic compositions which comprises hydrolyzing a copolymer of a plurality of copolymerizable materials including a vinyl ester and an unsaturated alkyd resin produced by reaction of an alcoholic substance comprising polyhydric alcohol with a carboxylic acid substance comprising alpha, beta polycarboxylic acid containing aliphatic unsaturation between the alpha and beta carbon atoms, and acetalizing the hydrolyzed copolymer until at least some of the hydroxyl groups of the hydrolyzed copolymer have been replaced by acetal groups.

3. The process of preparing new sythetic compositions which comprises hydrolyzing a copolymer of a vinyl ester and an esterification product of a polyhydric alcohol with a carboxylic acid substance comprising alpha, beta polycarboxylic acid containing aliphatic unsaturation between the alpha and beta carbon atoms, and acetalizing the hydrolyzed copolymer until at least 50 per cent of its hydroxyl groups have been replaced by acetal groups.

4. The process of preparing new synthetic compositions which comprises hydrolyzing a copolymer of a vinyl ester and an unsaturated alkyd resin obtained by chemical interaction of the components of a mixture including a polyhydric alcohol and an alpha, beta polycarboxylic acid containing aliphatic unsaturation between the alpha and beta carbon atoms, and ketalizing the hydrolyzed copolymer until at least 50 per cent of its hydroxyl groups have been replaced by ketal groups.

5. The process of preparing new synthetic compositions which comprises forming a cross-linked copolymer of a vinyl ester having at least one

grouping and an unsaturated alkyd resin and being the resinous reaction product of ingredients comprising a polyhydric alcohol and an alpha, beta poly-carboxylic acid containing aliphatic unsaturation between the alpha and beta carbon atoms, hydrolyzing the said copolymer to at least 10 per cent of that theoretically possible and acetalizing the hydrolyzed copolymer until at least 10 per cent of its hydroxyl groups have been replaced by acetal groups.

6. The process of preparing new synthetic compositions which comprises hydrolyzing, to from 25 to 100 per cent of that theoretically possible, a copolymer of a vinyl ester and an unsaturated alkyd resin obtained by reaction of a substance comprising polyhydric alcohol with a substance comprising alpha, beta polycarboxylic acid containing aliphatic unsaturation between the alpha and beta carbon atoms, and simultaneously with the hydrolysis reaction acetalizing the hydrolyzed copolymer until at least 50 per cent of its hydroxyl groups have been replaced by acetal groups.

7. A process as in claim 6 wherein the hydrolyzed copolymer is acetalized until from 60 to 100 per cent of its hydroxyl groups have been replaced by acetal groups.

8. A process as in claim 6 wherein the copolymer is hydrolyzed to from 50 to 100 per cent of that theoretically possible and the hydrolyzed copolymer is acetalized until from 75 to 100 per cent of its hydroxyl groups have been replaced by acetal groups.

9. The process of preparing new synthetic compositions which comprises reacting the components of a mass comprising (1) a

organic compound selected from the class consisting of aldehydes, ketones and mixtures of aldehydes and ketones and (2) a hydrolyzed copolymer of a plurality of copolymerizable materials including vinyl acetate and an unsaturated alkyd resin obtained by reaction of an alcoholic substance comprising polyhydric alcohol and a carboxylic acid substance comprising alpha, beta polycarboxylic acid containing aliphatic unsaturation between the alpha and beta carbon atoms, said reaction being carried out in a liquid medium and in the presence of an acid catalyst until at least 50 per cent of the hydroxyl groups of the hydrolyzed copolymer have been replaced by the corresponding acetal, ketal or acetal and ketal groups, and isolating the acetalized copolymer from the reaction mass.

10. A composition comprising a reaction product of ingredients comprising (1) a hydrolyzed copolymer of a plurality of copolymerizable materials, one of which is a vinyl ester having at least one

grouping and another of which is an unsaturated alkyd resin obtained by reaction of ingredients comprising a polyhydric alcohol and an alpha, beta polycarboxylic acid containing aliphatic unsaturation between the alpha and beta carbon atoms, and (2) a

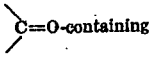

organic compound selected from the class consisting of aldehydes, ketones and mixtures of aldehydes and ketones.

11. An organic plastic material obtained by reaction of ingredients comprising an aldehyde and a hydrolyzed copolymer of a vinyl ester and an unsaturated alkyd resin obtained by reaction of a substance comprising polyhydric alcohol with a substance comprising alpha, beta polycarboxylic acid containing aliphatic unsaturation between the alpha and beta carbon atoms.

12. A composition comprising the resinous reaction product of a plurality of reactants including (1) a ketone and (2) a hydrolyzed copolymer of a plurality of copolymerizable materials, one of which is a vinyl ester having at least one

grouping and another of which is an unsaturated alkyd resin, said alkyd resin being the resinous product of reaction of ingredients comprising a polyhydric alcohol and an alpha, beta polycarboxylic acid containing aliphatic unsaturation between the alpha and beta carbon atoms.

13. A composition comprising the acetal obtained by reaction of an aldehyde with a hydrolyzed copolymer of vinyl acetate and an unsaturated alkyd resin obtained by reaction of a mixture including a polyhydric alcohol and an alpha, beta polycarboxylic acid containing aliphatic unsaturation between the alpha and beta carbon atoms.

14. A synthetic plastic material obtained by reaction of formaldehyde with a mass comprising a hydrolyzed copolymer of vinyl acetate and an unsaturated alkyd resin obtained by reaction of ingredients comprising a polyhydric alcohol and an alpha, beta polycarboxylic acid containing aliphatic unsaturation between the alpha and beta carbon atoms.

15. A plastic composition obtained by reaction of butyraldehyde with a substance comprising a hydrolyzed copolymer of vinyl acetate and an unsaturated alkyd resin obtained by reaction of ingredients comprising a polyhydric alcohol and an alpha, beta polycarboxylic acid containing aliphatic unsaturation between the alpha and beta carbon atoms.

16. The product obtained by simultaneously hydrolyzing and acetalizing a copolymer of vinyl acetate and ethylene glycol maleate.

17. An artificial mass especially adapted for use in the plastics and coating arts, said mass comprising a plasticized, hydrolyzed copolymer of vinyl acetate and ethylene glycol maleate in which at least 50 per cent of the hydroxyl groups have been replaced by formal groups.

18. A composition comprising the reaction product of an aldehyde with a mass comprising a hydrolyzed copolymer of vinyl acetate and diethylene glycol fumarate.

19. An organic plastic material comprising a hydrolyzed copolymer of vinyl acetate and diethylene glycol fumarate in which at least 50 per cent of the hydroxyl groups have been replaced by butyral groups.

20. An insulated electrical conductor comprising a metallic conductor and insulation thereon comprising the product of reaction of ingredients comprising (1) a hydrolyzed copolymer of a plurality of copolymerizable materials, one of which is a vinyl ester having at least one

grouping and another of which is an unsaturated alkyd resin obtained by reaction of ingredients comprising a polyhydric alcohol and an alpha, beta polycarboxylic acid containing aliphatic unsaturation between the alpha and beta carbon atoms, and (2) a

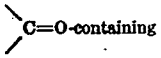

compound selected from the class consisting of aldehydes, ketones and mixtures of aldehydes and ketones.

GAETANO F. D'ALELIO.

Certificate of Correction

Patent No. 2,332,898.  October 26, 1943.

GAETANO F. D'ALELIO

It is hereby certified that errors appear in the printed specification of the above numbered patent requiring correction as follows: Page 1, first column, line 8, for "aketalized" read *a ketalized*; and second column, lines 32, 33, and 34, for that portion of the formula reading read

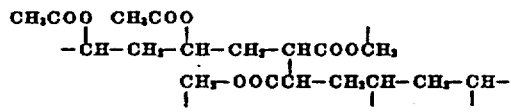

page 3, second column, line 65, for "finished" read *reaction*; page 4, first column, line 21, for "polymer" read *copolymer*; page 8, first column, line 46, in the table, for "HCHO)_____ 13" read *HCHO)_____ 18*; page 9, first column, line 57, for "CH₂OCOR" read *CR₂OCOR*; and second column, line 34, for "0.01" read *0.1*; line 68, for "e. f.," read *e. g.*,; line 71, for "400" read *4000*; page 10, first column, line 2, for "furfural alcohol" read *furfuryl alcohol*; page 11, first column, line 16, for "polycarboxylic" read *polycarboxylic*; and that the said Letters Patent should be read with these corrections therein that the same may conform to the record of the case in the Patent Office.

Signed and sealed this 11th day of January, A. D. 1944.

[SEAL]

HENRY VAN ARSDALE,
*Acting Commissioner of Patents.*